United States Patent [19]
O'Hara

[11] 3,734,062
[45] May 22, 1973

[54] NON-SPILLING DISH FOR DOGS AND THE LIKE

[76] Inventor: Jamie O'Hara, 3306 Deer Creek, San Antonio, Tex. 78230

[22] Filed: Jan. 28, 1972

[21] Appl. No.: 221,546

[52] U.S. Cl. ................................................. 119/61
[51] Int. Cl. ............................................. A01k 05/00
[58] Field of Search ..................... 119/51, 61, 51.5; 220/94 A; 229/2.5

[56] References Cited
UNITED STATES PATENTS

| 491,702 | 2/1893 | Felix | 119/61 |
| 1,257,119 | 2/1918 | Reynolds | 220/94 A |
| 2,813,509 | 11/1957 | Bruno | 119/51 |

*Primary Examiner*—Hugh R. Chamblee

[57] ABSTRACT

An animal feeding and watering dish device. This device consists primarily of a bowl like structure within integral and recessed flanging for catching food and water when the pet is being fed.

2 Claims, 3 Drawing Figures

PATENTED MAY 22 1973

3,734,062

NON-SPILLING DISH FOR DOGS AND THE LIKE

This invention relates to feeding utensils for animals, and more particularly to a non-spilling dish for dogs, cats and other animals.

It is therefore the primary purpose of this invention to provide a dish for animals which will eliminate cleaning up food and water after the animal uses the dish.

Another object of this invention is to provide a dish of the type described which will be of such structure, so as to prevent the animal from tipping the dish over.

Another object of this invention is to provide a dish of the type described which will absolutely prevent the animal from soiling the floor around the dish when eating and drinking water therefrom and the dish will be of such material, that the animal will not puncture the structure with its teeth.

A further object of this invention is to provide a dish of the type described which will have a recessed flange portion for imparting stability thereto so as to prevent the animal from kicking the dish over.

A still further object of this invention is to provide a dish of the type described which will have extending lips which will provide handle means for the user to easily pick the dish up, the handle portion also having opening means for suspending the dish from the wall or the like when it is not in use.

Other objects of the present invention are to provide a non-spilling dish for dogs and the like which is simple in design, inexpensive to manufacture, rugged in construction, easy to use and efficient in operation.

These and other objects will be readily evident upon a study of the following specification and the accompanying drawing wherein.

Figure 1:
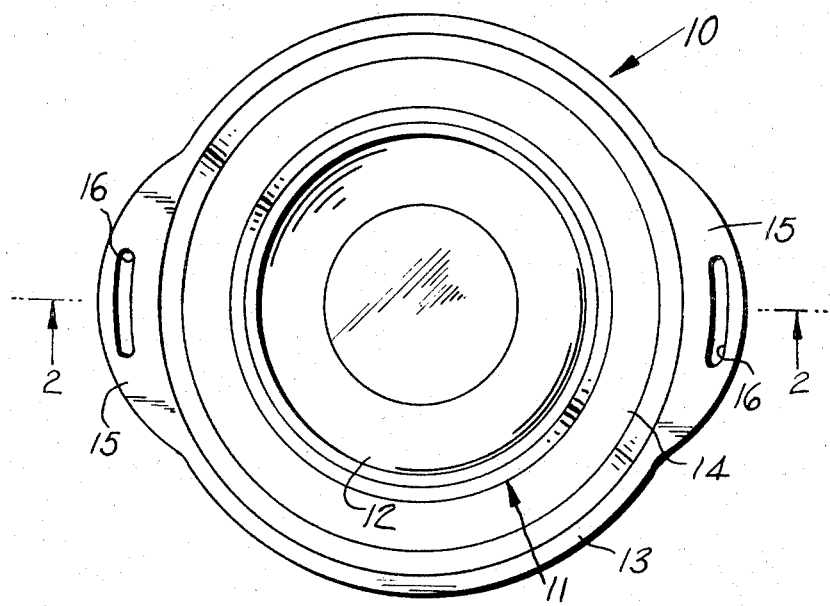
FIG. 1 is a top plan view of the present invention.
Figure 2:
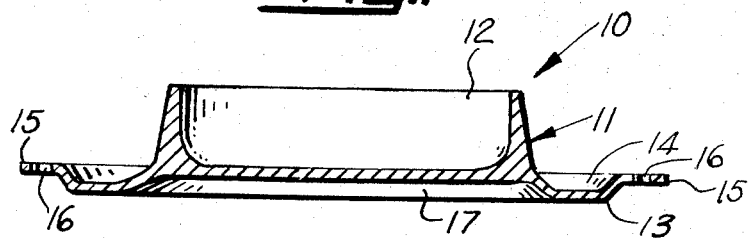
FIG. 2 is a cross-sectional view taken along the line 2—2 of FIG. 1.

According to this invention, a non-spilling dish for dogs and the like 10 is shown to consist of a circular main body 11 having a central opening 12 for the placement of food or water therein. Extending from the main body and integral therewith, is an annular flange 13 having an annular recess 14 therein for collecting any spills that may create while eating or drinking from the dish 10. A pair of oppositely opposed and extending lips 15 project from flange 13 and provides handle grip means for lifting dish 10, the openings 16 providing a means of suspending said dish from a hook or the like fastener when dish 10 is not in use.

In use, dish 10 is prevented from tipping by means of the flange 13 which extends outwards to form a stable base for dish 10. The main body portion 11 of dish 10 is provided with a recess 17 on its underside which serves as lightening means for the weight of dish 10.

It shall be noted that the extending lips of flange 13, provides a stable means of carrying the dish when it is full of food or water and the opening 16 for hanging dish 10 when it is not in use.

Figure 3:
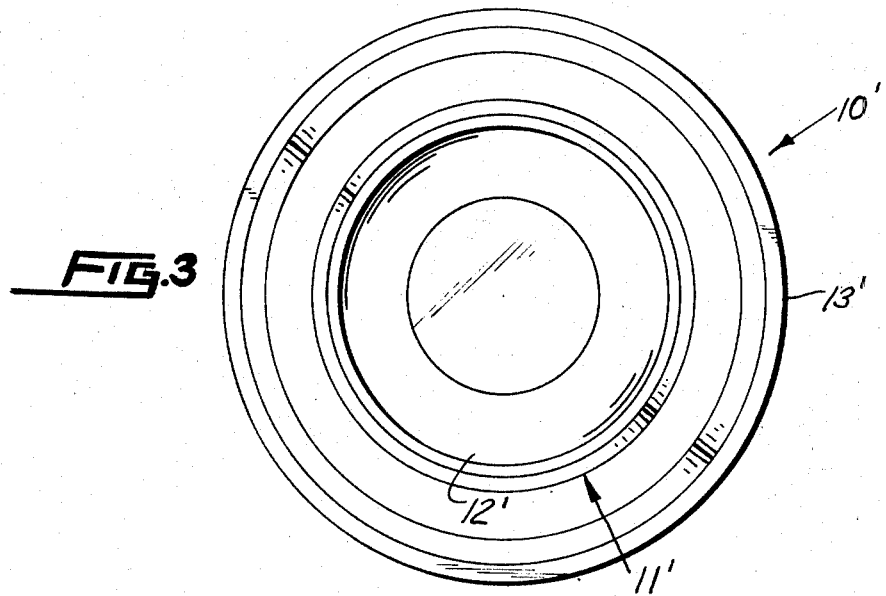
FIG. 3 is a top plan view of a modified form of the invention having no handle grips thereon.

Looking now at FIG. 3 of the drawing, one will see a modified form of dish 10' which includes a central main body 11' having an opening 12' for the introduction of food. The modified form of dish 10' also includes an annular flange 13' which is recessed to catch any food that is scattered by the animal while feeding and device 10' is similar in configuration to main embodiment of the present invention, with the exception that the handle grips are not included.

What I now claim is:

1. A non-spilling dish for animals comprising an upstanding main body including opening means for receiving food or water, the outer peripheral walls of said main body tapered outwardly and terminating downwardly in an integrally formed annular flange, said flange terminating laterally in an upturned and horizontally extending annular rim providing an annular recess circumferentially about said main body, a plurality of laterally extending lips integral with said rim to provide handle grip means for carrying said dish, and a recess below said main body bounded laterally by at least a portion of said flange.

2. The invention of claim 1 including an elongated, vertically extending slot in each of said lips.

* * * * *